(12) United States Patent
Derrett

(10) Patent No.: US 10,420,289 B2
(45) Date of Patent: Sep. 24, 2019

(54) PLANT BRANCH SPACER

(71) Applicant: Rickcardo Juan Derrett, Cleveland, OH (US)

(72) Inventor: Rickcardo Juan Derrett, Cleveland, OH (US)

(*) Notice: Subject to any disclaimer, the term of this patent is extended or adjusted under 35 U.S.C. 154(b) by 165 days.

(21) Appl. No.: 15/405,124

(22) Filed: Jan. 12, 2017

(65) Prior Publication Data

US 2018/0192595 A1    Jul. 12, 2018

(51) Int. Cl.
*A01G 17/10* (2006.01)

(52) U.S. Cl.
CPC .................... *A01G 17/10* (2013.01)

(58) Field of Classification Search
CPC ........ A01G 9/128; A01G 17/10; A01G 17/04; A01G 17/06; A01G 17/08; A01G 17/085; A01G 9/12; A44C 5/246; A44C 9/02; E05B 75/00
USPC ................ 47/45, 44, 42, 70, 46, 47; 269/86; 70/19, 16
See application file for complete search history.

(56) References Cited

U.S. PATENT DOCUMENTS

| | | | | |
|---|---|---|---|---|
| 754,542 A | * | 3/1904 | Chessman | A01G 9/12 47/47 |
| 1,084,240 A | * | 1/1914 | Thoeni | A01G 17/10 47/43 |
| 1,842,435 A | * | 1/1932 | Walker | A01G 9/128 47/47 |
| 1,860,405 A | * | 5/1932 | Cheesewright | A01G 9/12 47/41.13 |
| 1,892,393 A | * | 12/1932 | Halm | A01G 5/04 47/41.13 |
| 2,003,101 A | * | 5/1935 | Asman | A01G 9/12 131/242.6 |
| 2,121,379 A | * | 6/1938 | Young | E01F 15/141 256/1 |
| 2,124,049 A | * | 7/1938 | Battista | A01G 9/128 24/343 |
| 2,174,955 A | * | 10/1939 | Wade | A01G 9/128 47/47 |

(Continued)

FOREIGN PATENT DOCUMENTS

| | | | | |
|---|---|---|---|---|
| CA | 2955225 A1 | * | 3/2015 | ............. A01G 9/124 |
| CH | 346721 A | * | 5/1960 | ............. A01G 17/08 |

(Continued)

*Primary Examiner* — Kathleen I Alker

(57) ABSTRACT

A plant branch spacer that is utilized to spread or otherwise manipulate the direction of branches, without interfering with the roots; the plant branch spacer having an expandable ring, a plurality of knobs, and a locking mechanism. The expandable ring has a first arc-section and a second arc-section that are slidably engaged with each other, allowing the expandable ring to contract, expand, and separate. The locking mechanism is connected to the first arc-section and removably engaged with the second arc-section, wherein the locking mechanism secures the second arc-section in place along the first arc-section. The plurality of knobs is positioned about the expandable ring, and distributed to form a series of pockets used to separate branches from one another. A branch manipulator can be attached to one of the plurality of knobs in order to further redirect one or more branches away from the expandable ring.

10 Claims, 10 Drawing Sheets

(56) References Cited

U.S. PATENT DOCUMENTS

| | | | | |
|---|---|---|---|---|
| 2,763,096 A * | 9/1956 | Roger | A01G 9/12 | 47/41.01 |
| 2,862,334 A * | 12/1958 | Sandvig | A01G 9/12 | 47/47 |
| 3,026,649 A * | 3/1962 | Barakauskas | A01G 9/12 | 47/47 |
| 4,848,027 A * | 7/1989 | Skierwiderski | A01G 17/14 | 47/42 |
| 5,138,852 A * | 8/1992 | Corcoran | E05B 75/00 | 70/16 |
| 5,440,834 A * | 8/1995 | Kleinert | A01G 9/12 | 248/217.1 |
| 5,474,268 A * | 12/1995 | Yu | A01G 17/08 | 248/61 |
| 6,032,989 A * | 3/2000 | DeWalch | B65D 45/32 | 292/256.6 |
| 7,225,639 B2 * | 6/2007 | Flaviano | A44C 9/02 | 63/15.45 |
| 7,845,191 B2 * | 12/2010 | Czajka | A44C 5/0084 | 63/15.5 |
| 9,167,755 B1 * | 10/2015 | Kampman | A01G 9/12 | |
| 10,076,087 B2 * | 9/2018 | Wen | A01G 9/12 | |
| 2002/0178749 A1 * | 12/2002 | Katano | A44C 9/02 | 63/15.7 |
| 2007/0056332 A1 * | 3/2007 | Parsons | E05B 75/00 | 70/16 |
| 2012/0023818 A1 * | 2/2012 | Rasmussen | A01G 9/12 | 47/45 |
| 2014/0183311 A1 * | 7/2014 | Peterson | A47B 81/00 | 248/218.4 |
| 2015/0223412 A1 * | 8/2015 | Vanderwall-Arnold | A01G 9/12 | 47/45 |
| 2018/0220606 A1 * | 8/2018 | Daniel | A01G 9/12 | |

FOREIGN PATENT DOCUMENTS

| | | | | |
|---|---|---|---|---|
| CH | 354979 A * | 6/1961 | | A01G 9/128 |
| DE | 3536572 A1 * | 4/1987 | | A01G 9/128 |

* cited by examiner

PLANT BRANCH SPACER

FIELD OF THE INVENTION

The present invention relates generally to the field of botany. More specifically, the present invention is a plant branch space that is utilized to spread or otherwise manipulate the direction of branches, without interfering with the roots.

BACKGROUND OF THE INVENTION

It is often desirable to manipulate the direction in which plant branches grow, whether for aesthetic purposes or practical purposes, such as exposing the inner branches to more light. As such, devices have been developed to engage with plant branches in order to direct the branches in the desired direction. However, many of these branch manipulation devices can cause unnecessary harm to the plant. For example, many branch manipulation devices are placed in the soil around the plant, and extend upwards into the branches. Such devices can damage the roots of the plant, either by poking the roots or disrupting the growth of the roots. Other branch manipulation devices include weights that are attached to the branches in order to bend the branches downwards. However, the application of too much force in a single instance, or the stress over time, can cause branches to snap. Furthermore, many of devices for manipulating plant branches can only be utilized in conjunction with a single branch. Thus, several devices are required which can become unsightly and/or become a financial burden.

Therefore it is an object of the present invention to provide a plant branch spacer that is capable of redirecting multiple branches at once. Furthermore, it is an object of the present invention to provide a plant branch spacer that does not interfere with the roots of the plant or place undue stress on the branches of the plant. The present invention includes an expandable ring, a plurality of knobs, and a locking mechanism. The plurality of knobs is exteriorly distributed about the expandable ring, wherein the plurality of knobs forms a series of pockets into which the branches are positioned and spaced apart. The expandable ring is positioned around the stem of a plant and places an outward force on the branches. Resultantly, the branches are spread allowing for more light to reach the inner branches and leaves. The expandable ring has a first arc-section and a second arc-section that are slidably engaged with each other, allowing the expandable ring to contract, expand, and separate. In turn the present invention can be easily positioned about a plant and utilized with plants of various size. A plurality of branch manipulators may also be used to further manipulate branches away from the expandable ring; the plurality of branch manipulators being attached to the plurality of knobs.

DETAIL DESCRIPTIONS OF THE INVENTION

All illustrations of the drawings are for the purpose of describing selected versions of the present invention and are not intended to limit the scope of the present invention.

The present invention is a plant branch spacer that is utilized to spread or otherwise manipulate the direction of branches, without interfering with the roots. The present invention encircles the stem of a plant, wherein the plant branch spacer places an outward force on the branches of the plant, in order to spread the branches. Furthermore, the outward force holds the present invention in place, suspended above the soil, such that the roots of the plant are not poked, damaged, or otherwise interfered with.

Figure 1:
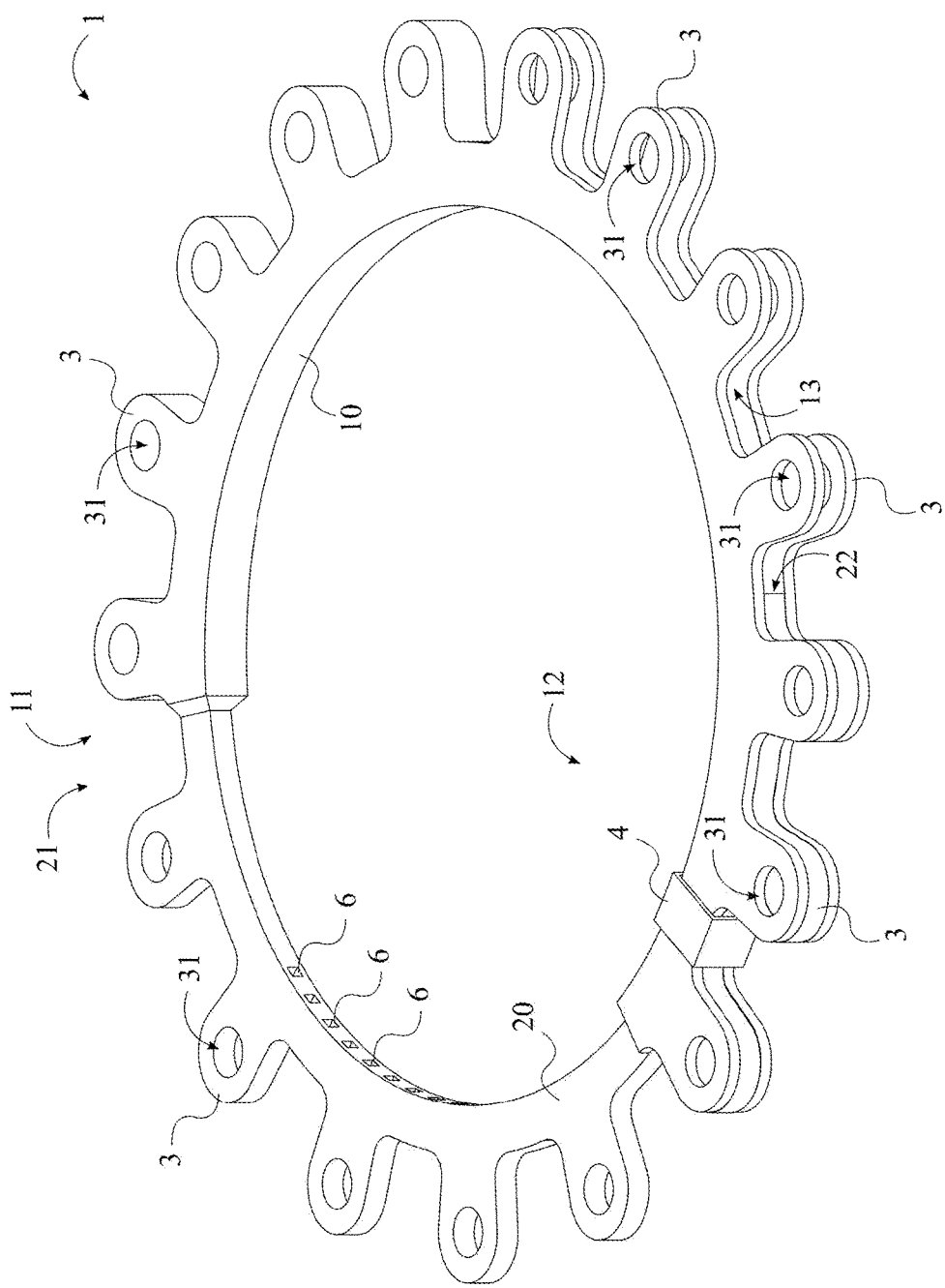
FIG. 1 is a perspective view of the present invention, wherein the second arc-section is slidably positioned into the first arc-section.
Figure 8:
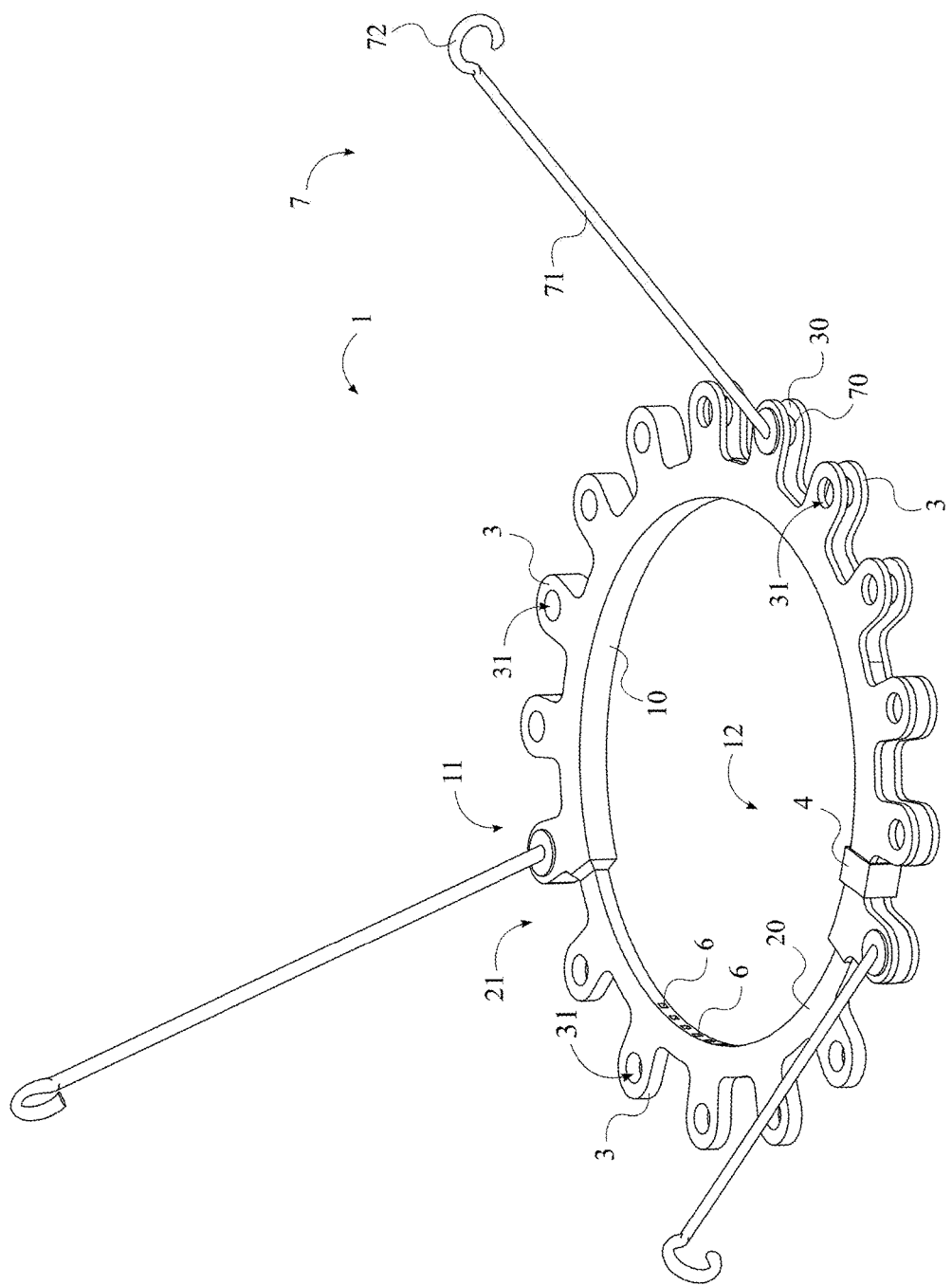
FIG. 8 is a perspective view of the present invention, wherein a plurality of branch manipulators is disposed about the expandable ring and attached to the plurality of knobs.

In reference to FIG. 1, the present invention comprises an expandable ring 1, a plurality of knobs 3, and a locking mechanism 4. The expandable ring 1, in conjunction with the plurality of knobs 3, acts to radially spread out the branches, allowing inner branches and leaves to receive sunlight. Additionally, a plurality of branch manipulators may be utilized to further manipulate the direction of selected branches; the plurality of branch manipulators being radially positioned around the expandable ring 1 as depicted in FIG. 8.

In further reference to FIG. 1, each of the plurality of knobs 3 is adjacently connected to the expandable ring 1, acting as a divider between adjacent branches. The plurality of knobs 3 is perimetrically distributed about the expandable ring 1, wherein each of the plurality of knobs 3 is exteriorly positioned about the expandable ring 1 (i.e. positioned about the exterior radius of the expandable ring 1). In this way, the plurality of knobs 3 creates a series of pockets; a pocket being formed in between each adjacent knob. Outer branches can be positioned into selected pockets, providing the desired amount of separation and exposure of sunlight to the inner branches and leaves.

Figure 2:
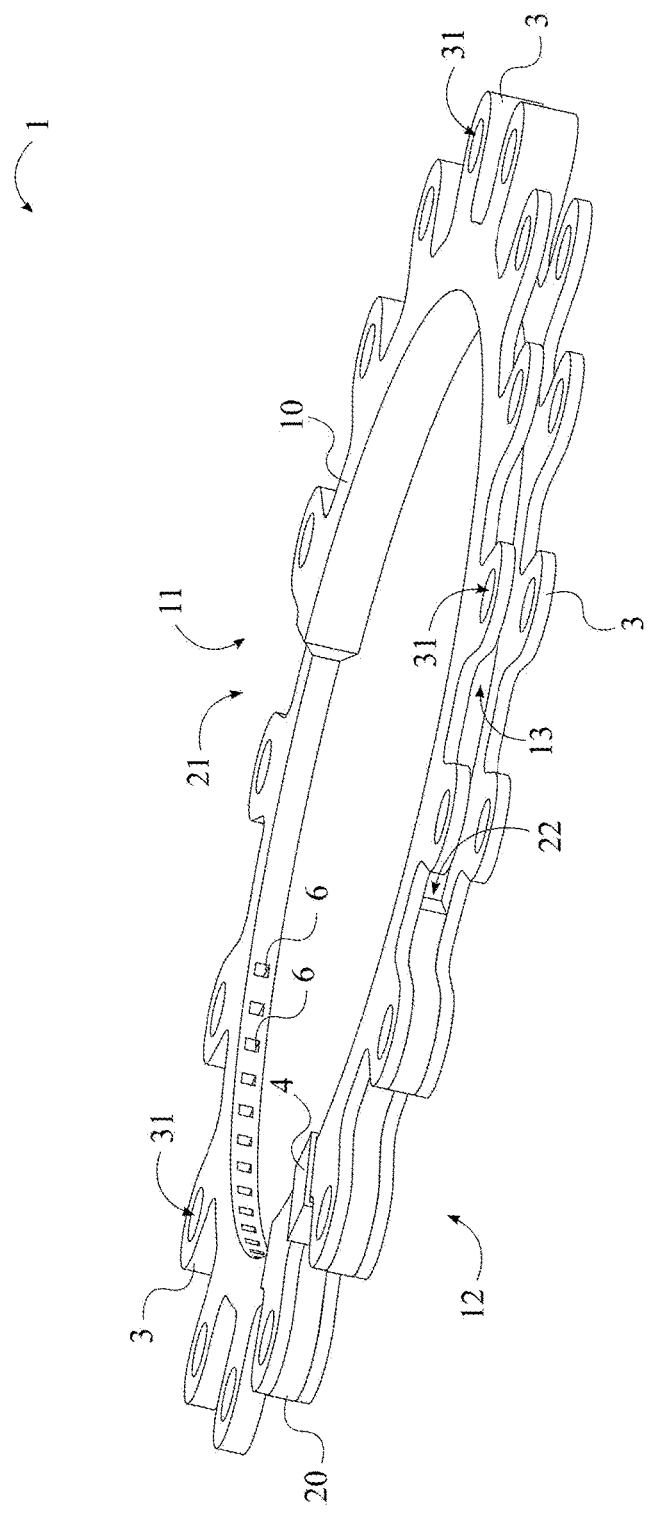
FIG. 2 is a perspective view detailing the receiving channel into which the second arc-section is slidably positioned.

In reference to FIG. 1-2, the expandable ring 1 comprises a first arc-section 10 and a second arc-section 20; the first arc-section 10 comprising a proximal end 11 and a distal end 12, and the second arc-section 20 comprising a terminal end 21 and a free end 22. The terminal end 21 is adjacently attached to the proximal end 11, wherein the first arc-section 10 and the second arc-section 20 are terminally connected to each other and fixed in place. Meanwhile, the free end 22 is removably engaged with the distal end 12, such that the expandable ring 1 can be separated and opened up. This allows the expandable ring 1 to easily be fitted around the stem of the plant.

Figure 3:
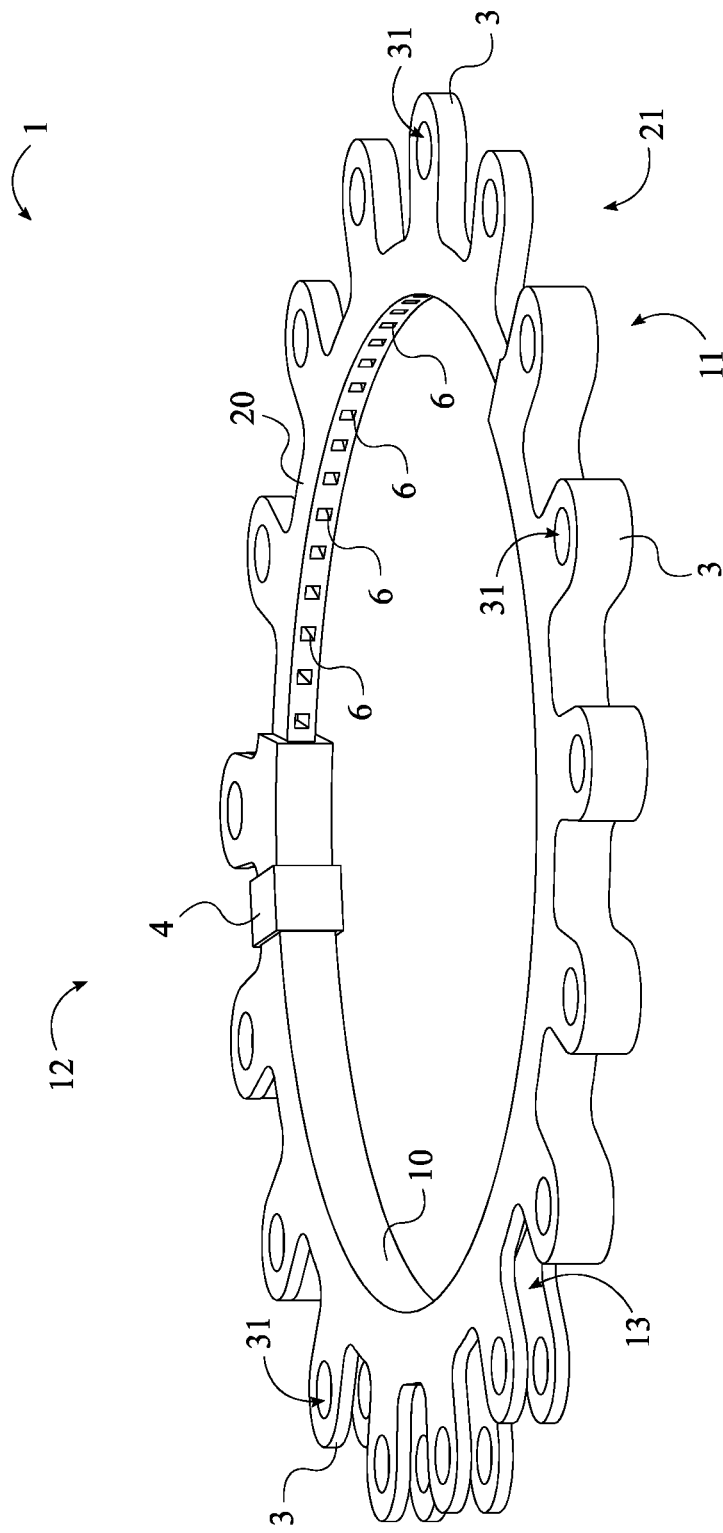
FIG. 3 is a rear perspective view detailing the locking mechanism in the locked position.

In reference to FIG. 3, the locking mechanism 4 is adjacently connected to the distal end 12, and is removably engaged with the free end 22. In this way, the locking mechanism 4 can be disengaged from the free end 22 in order to separate the second arc-section 20 from the first arc-section 10 and open up the expandable ring 1. Conversely, the locking mechanism 4 can be engaged with the free end 22 in order to lock the second arc-section 20 to the first arc-section 10 and maintain the expandable ring 1 in a closed position. The locking mechanism 4 can be engaged in multiple locations along the free end 22 in order to adjust the operable radius of the expandable ring 1.

In reference to FIG. 2, in the preferred embodiment of the present invention, the first arc-section 10 comprises a receiving channel 13 into which the free end 22 is positioned. The free end 22 is positioned within the receiving channel 13, such that the free end 22 is slidably engaged with the first arc-section 10. When the locking mechanism 4 is disengaged from the free end 22, the free end 22 can be repositioned along the receiving channel 13. the In this way, the effective radius of the expandable ring 1 can be adjusted, allowing the present invention to be adapted to plants of various size.

Figure 6:
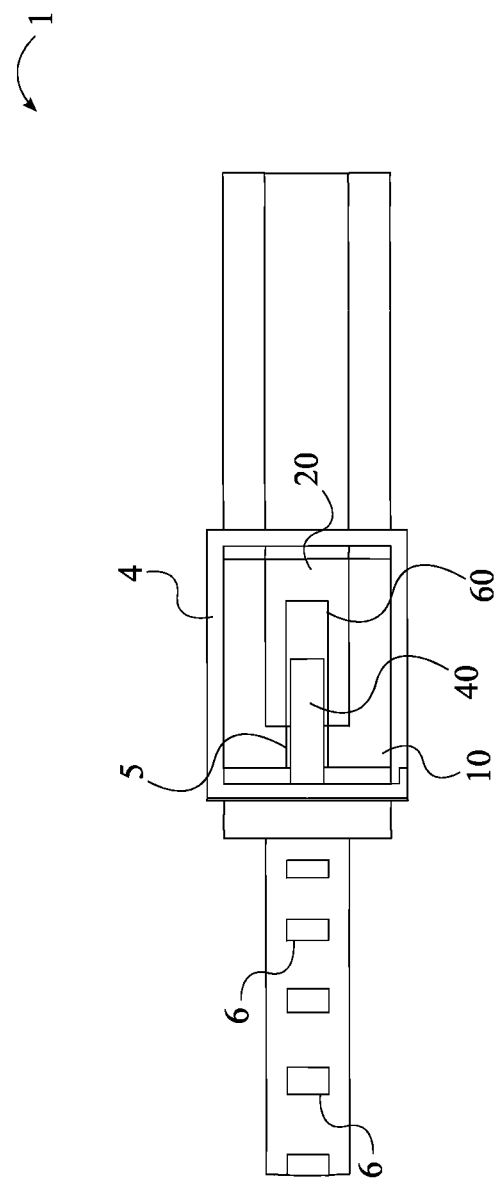
FIG. 6 is a side sectional detail view of the locking mechanism, wherein the tooth is slidably engaged through the lock slot and into the specific lock slot.

More specifically, in the preferred embodiment, the first arc-section 10 has a U-shaped cross section, as depicted in FIG. 6. In this way, the first arc-section 10 has a first lateral wall, a second lateral wall, and a third lateral wall. The first lateral wall and the second lateral wall are positioned parallel to each other, while the third lateral wall is positioned perpendicular to the first lateral wall and the second lateral wall. Furthermore, the third lateral wall is aligned with the interior radius of the expandable ring 1, such that the receiving channel 13 is open to the exterior of the expandable ring 1.

Figure 4:
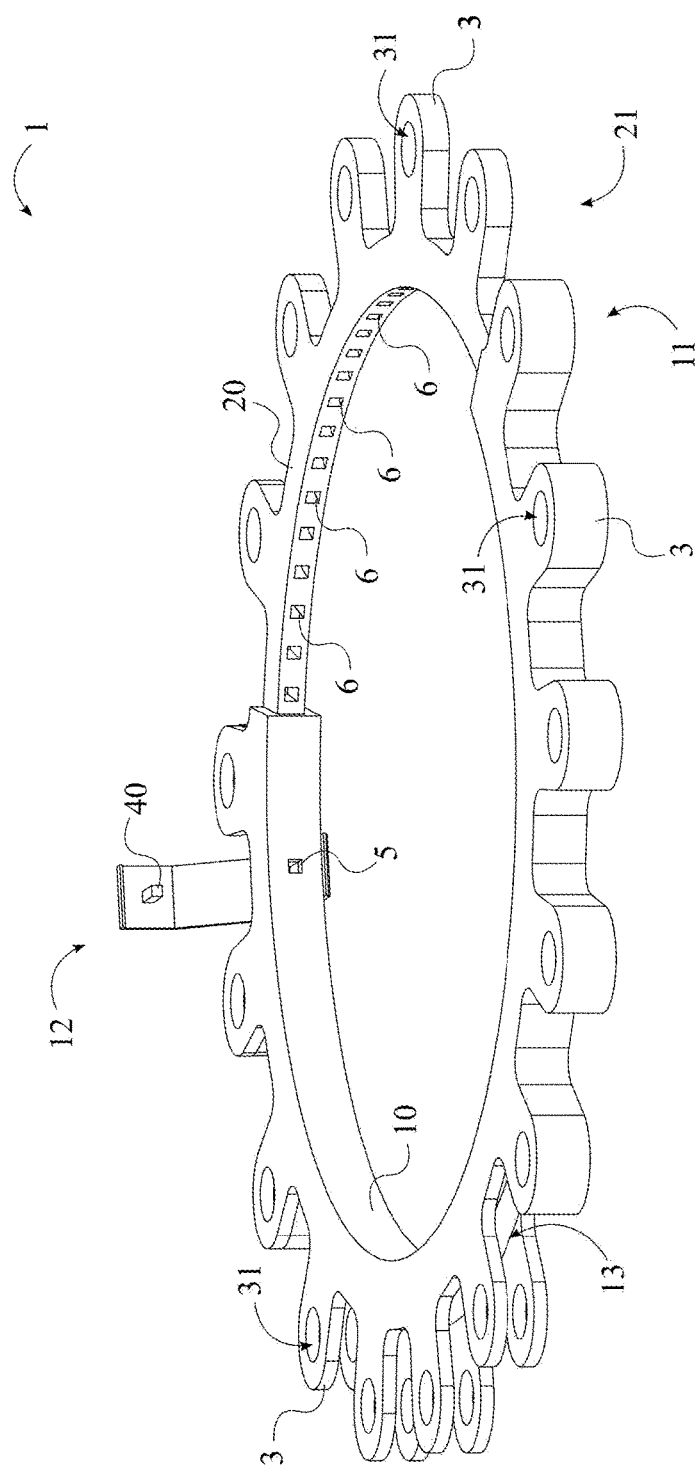
FIG. 4 is a rear perspective view, wherein the locking mechanism is unlocked to show the lock slot that traverses through the first arc-section.
Figure 5:
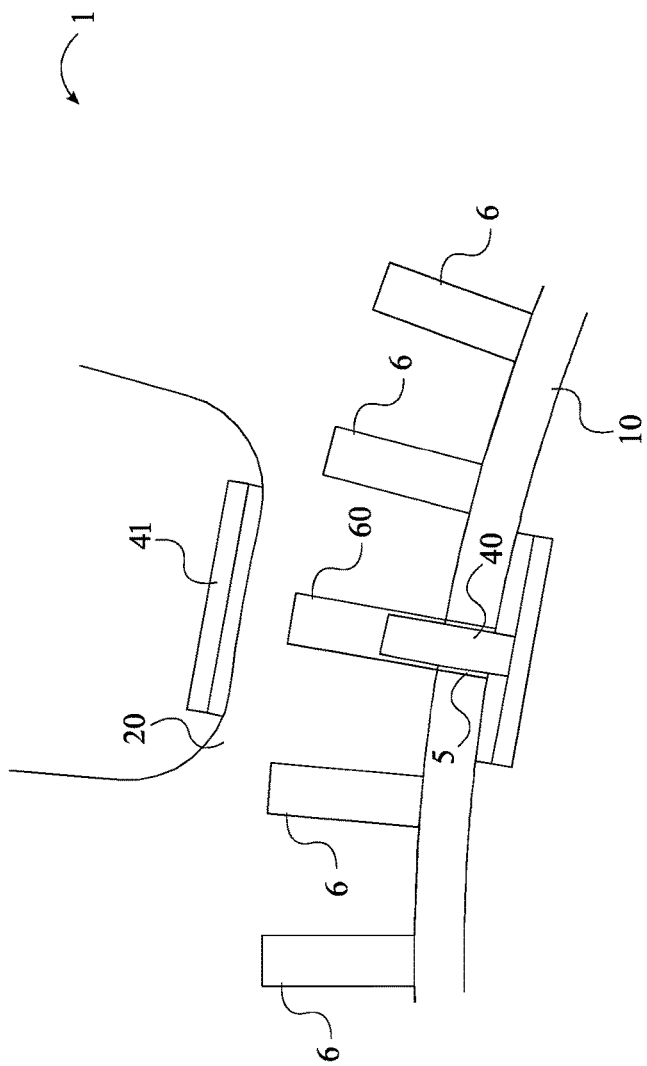
FIG. 5 is a top sectional detail view of the locking mechanism, wherein the specific lock slot from the plurality of lock slots is aligned with the lock slot.

In reference to FIG. 4-5, a lock slot 5 and a plurality of lock slots 6 allow the locking mechanism 4 to engage with the free end 22. The lock slot 5 laterally traverses through the distal end 12; more specifically, through the third lateral wall. Meanwhile, the plurality of lock slots 6 is positioned along the second arc-section 20; each of the plurality of lock slots 6 laterally traversing into the second arc-section 20. The plurality of lock slots 6 may traverse fully or partially through the second arc-section 20. The locking mechanism 4 is removably engaged with at least one of the plurality of lock slots 6 in order to maintain the position of the second arc-section 20 along the receiving channel 13.

In reference to FIG. 5-6, in the preferred embodiment of the present invention, the locking mechanism 4 comprises a tooth 40 and a multi-hinged binder. The multi-hinged binder has four panels that are hingedly connected to each other. A first panel is adjacently connected to the distal end 12 and is fixed in place. A second panel is terminally and hingedly connected to the first panel, while a third panel is terminally and hingedly connected to the second panel opposite the first panel. Similarly, a fourth panel is terminally and hingedly connected to the third panel opposite the second panel.

The multi-hinged binder can be wrapped around the distal end 12, wherein the fourth panel engages with the first panel in a locked position. The fourth panel may engage the first panel through a snap connection or any other similar locking method that allows the user to easily engage and disengage the two panels. The tooth 40 is adjacently connected to the fourth panel and aligned such that when the locking mechanism 4 is in the locked position, the tooth 40 is positioned through the lock slot 5 and into a specific lock slot 60 from the plurality of lock slots 6. In this way, the tooth 40 prevents the second arc-section 20 from freely sliding within the receiving channel 13.

In another embodiment of the present invention, the locking mechanism 4 further comprises a release button 41. The tooth 40 is positioned through the lock slot 5 and into the specific lock slot 60. Together, the tooth 40 and the plurality of lock slots 6 form a ratcheting mechanism, wherein the second arc-section 20 is able to travel further into the receiving channel 13 (decreasing the radius of the expandable ring 1) but not in the opposite direction along the receiving channel 13 (increasing the radius of the expandable ring 1). The tooth 40 may be pivotally mounted to form a pawl, or simply have an angled edge, allowing the second arc-section 20 to pass over the tooth 40 in one direction.

The tooth 40 is mechanically coupled to the release button 41, wherein user actuation of the release button 41 displaces the tooth 40 from the specific lock slot 60. In turn, the second arc-section 20 is able to traverse out of the receiving channel 13, increasing the radius of the expandable ring 1. The tooth 40 may be mechanically coupled to the release button 41 by a spring, lever, or any other suitable mechanical means that displaces the tooth 40 from the specific lock slot 60. As such, the release button 41 can be a press button, slide, etc.

In another embodiment of the present invention, the locking mechanism 4 is slidably engaged with the distal end 12 and comprises the tooth 40. The locking mechanism 4 is bistably positioned, such that the locking mechanism 4 can be toggled between a locked position and an unlocked position. In the locked position, the tooth 40 is engaged with the free end 22, while in the unlocked position, the tooth 40 is disengaged from the free end 22.

To engage the tooth 40 with the free end 22, the specific lock slot 60 is aligned with the lock slot 5. The locking mechanism 4 is then slid from the unlocked position to the locked position, wherein the tooth 40 traverses through the lock slot 5 and into the specific lock slot 60. In this way, the tooth 40 prevents the free end 22 from sliding along the receiving channel 13, thus locking the second arc-section 20 in place.

In other embodiments, the locking mechanism 4 may further comprise one or more subsequent teeth, wherein one or more subsequent lock slots laterally traverses through the distal end 12. To engage the one or more subsequent teeth with the free end 22, one or more specific lock slots from the plurality of lock slots 6 is aligned with the one or more subsequent lock slots. With the one or more specific lock slots aligned with the one or more subsequent lock slots, the one or more subsequent teeth is positioned through the one or more subsequent lock slots, into the one or more specific lock slots. The use of multiple teeth provides additional security as compared to a singular tooth 40.

Figure 9:
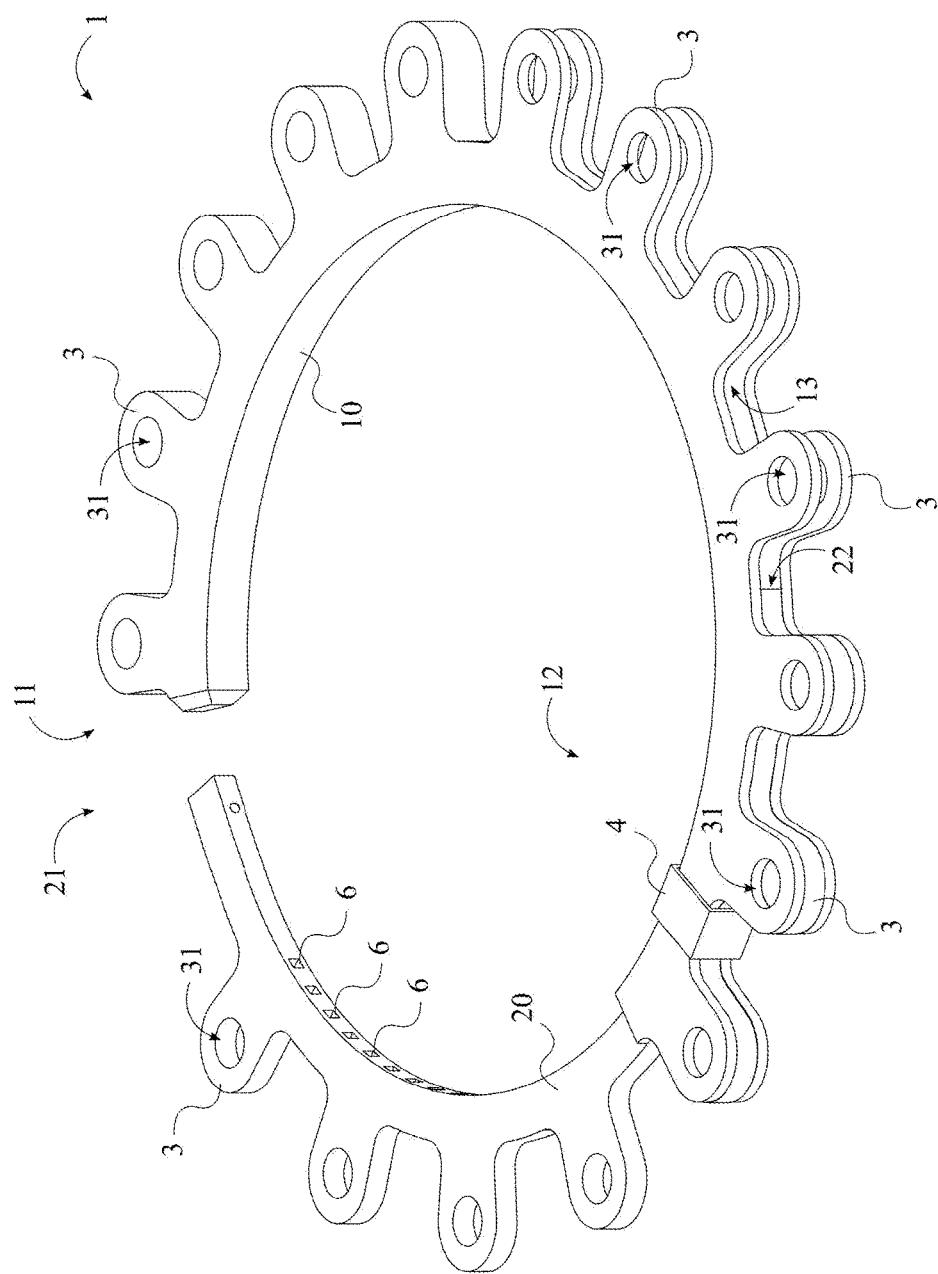
FIG. 9 is a perspective view of the present invention, wherein the proximal end is disconnected from the terminal end.
Figure 10:
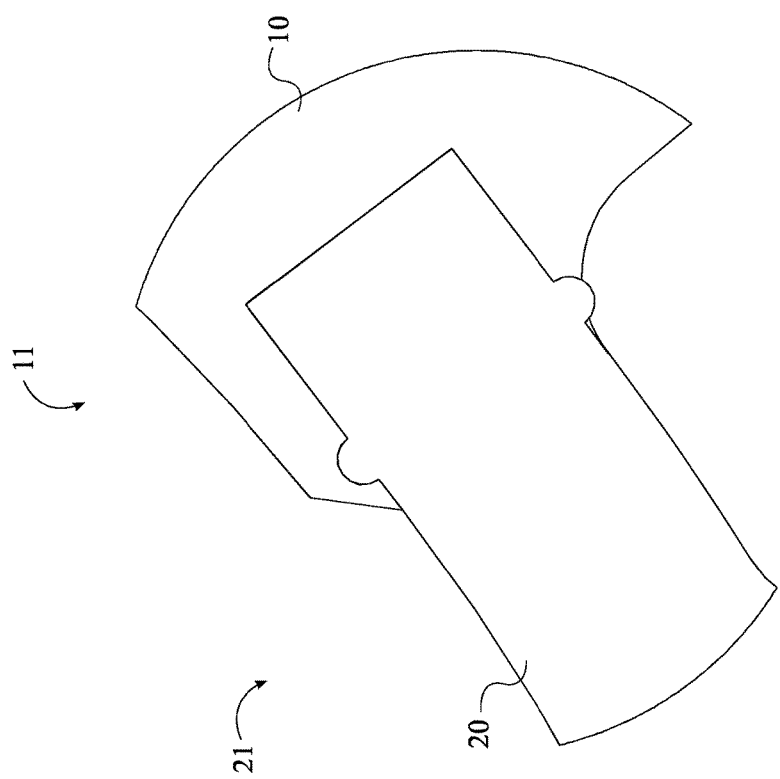
FIG. 10 is a detail, sectional view of the proximal end being engaged with the terminal end.

In reference to FIG. 9-10, in addition to separating the first arc-section 10 from the second arc-section 20 about the free end 22 and the distal end 12, the first arc-section 10 and the second arc-section 20 can be separated about the proximal end 11 and the terminal end 21. This allows the user to remove the present invention from a plant, while maintaining the same diameter of the expandable ring 1 once the proximal end 11 is reattached to the terminal end 21. In the preferred embodiment of the present invention, the proximal end 11 is attached to the terminal end 21 through a snap connection. However, it is possible for any other removable attachment method to be utilized, such as using a ball detent, lock pin, etc.

In reference to FIG. 10, in the preferred embodiment of the present invention, the terminal end 21 is positioned into the proximal end 11. The terminal end 21 comprises one or more nubs, while the proximal end 11 comprises one or more indents. When the terminal end 21 is positioned into the proximal end 11, the one or more nubs engages with the one or more indents, snapping and locking the terminal end 21 in place within the proximal end 11. It is also possible for the one or more nubs and the one or more indents to be switched, wherein the terminal end 21 comprises the one or more indents and the proximal end 11 comprises the one or more nubs. Additionally, the proximal end 11 can be positioned into the terminal 21 as another alternative.

Figure 7:
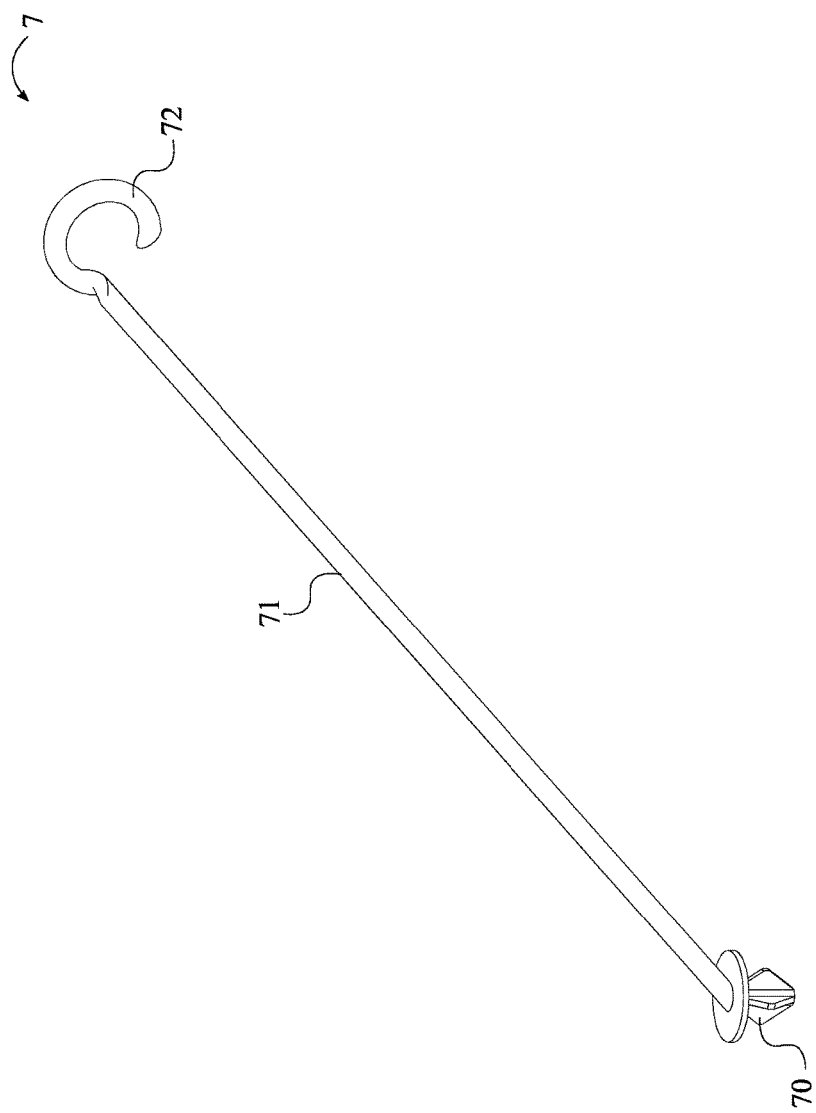
FIG. 7 is a perspective view of the branch manipulator, detailing the terminal connection of the knob connector and the hook to the rod.

The plurality of branch manipulators allows the user to manipulate the direction of branches above, below, and to the sides of the expandable ring 1. In reference to FIG. 7, each of the plurality of branch manipulators comprises a knob connector 70, a rod 71, and a hook 72; the knob connector 70 and the hook 72 being terminally connected to the rod 71 opposite each other. Meanwhile, each of the plurality of knobs 3 comprises an accessory connector 31 to which the knob connector 70 of one of the plurality of branch manipulators may be attached.

The user can position a branch within the hook 72 in order to separate the branch, bend the branch downwards, or otherwise redirect the branch. The rod 71 determines the distance of the hook 72 from the expandable ring 1, as well as the angle at which the hook 72 is positioned. The rod 71 may extend straight up, straight down, straight out, or at any other angle in relation to the expandable ring 1. Meanwhile, the knob connector 70 engages with one of the plurality of knobs 3 and provides an anchor that mounts the rod 71 in place and prevents the rod 71 from rotating.

A branch manipulator 7 is selected from the plurality of branch manipulators and is terminally attached to a specific knob 30 from the plurality of knobs 3, as depicted in FIG. 8. In the preferred embodiment of the present invention, the accessory connector 31 is a hole into which the knob connector 70 is positioned. In reference to FIG. 7, the knob connector 70 has one or more flanges that engage with an inner wall of the specific knob 30 to hold the branch manipulator 7 in place. Each of the flanges is flexible, wherein each of the flanges is squeezed together, or otherwise bent or distorted, in order to insert the knob connector 70 into the specific knob 30. Once inserted, the flanges spread out, creating a secure, frictional fit to retain the knob connector 70 within the specific knob 30, while also allowing the knob connector 70 to be rotated by applying some force. The inner wall may comprise one or more projections with which the one or more flanges is slotted, which in turn prevents the knob connector 70 from rotating within the hole.

In other embodiments, the accessory connector 31 of each of the plurality of knobs 3 and the knob connector 70 of each of the plurality of branch manipulators may form a different connection. For example, the accessory connector 31 and the knob connector 70 could form a snap connection, wherein the knob connector 70 it snapped into or onto the accessory connector 31. As another example, the accessory connector 31 and the knob connector 70 can each be a magnet, wherein a magnetic force binds the knob connector 70 to the accessory connector 31. Any other suitable connection may be utilized to temporarily attach the knob connector 70 to the accessory connector 31, in addition to the methods listed above.

Although the invention has been explained in relation to its preferred embodiment, it is to be understood that many other possible modifications and variations can be made without departing from the spirit and scope of the invention as hereinafter claimed.

What is claimed is:

1. A plant branch spacer comprising:
   an expandable ring;
   a plurality of knobs;
   a locking mechanism;
   the expandable ring comprising a first arc-section and a second arc-section;
   the first arc-section comprising a receiving channel, a proximal end and a distal end;
   the receiving channel being formed on the distal end;
   the proximal end and the distal end being oppositely located to each other;
   the second arc-section comprising a terminal end and a free end;
   the terminal end and the free end being oppositely located to each other;
   the terminal end being attached to the proximal end;
   the free end being slidably and removably engaged with the distal end;
   the free end being slidably and removably positioned within the receiving channel;
   the locking mechanism being connected to the distal end;
   the locking mechanism being removably engaged with the free end;
   the plurality of knobs being connected to the expandable ring;
   the plurality of knobs being perimetrically distributed about the expandable ring;
   the plurality of knobs being exteriorly positioned about the expandable ring;
   the plurality of knobs comprising a plurality of first knobs and a plurality of second knobs;
   the plurality of first knobs being connected to the distal end;
   the plurality of first knobs being perimetrically distributed about the distal end;
   the plurality of first knobs being exteriorly positioned about the distal end;
   the plurality of second knobs being connected to the free end;
   the plurality of second knobs being perimetrically distributed about the free end;
   the plurality of second knobs being exteriorly positioned about the free end; and
   a corresponding first knob among the plurality of first knobs and a corresponding second knob among the plurality of second knobs being laterally aligned with each other in response to the free end being engaged with the distal end and positioned within the receiving channel.

2. The plant branch spacer as claimed in claim 1 comprising:
   each of the plurality of knobs comprising an accessory connector.

3. The plant branch spacer as claimed in claim 2 comprising:
   each of the plurality of accessory connectors being a hole.

4. The plant branch spacer as claimed in claim 1 comprising:
   a branch manipulator; and
   the branch manipulator being removably and terminally attached to a specific knob among the plurality of knobs.

5. The plant branch spacer as claimed in claim 4 comprising:
the branch manipulator comprising a knob connector, a rod and a hook;
the knob connector and the hook each being terminally connected to the rod;
the knob connector and the hook being oppositely located to each other; and
the knob connector being removably attached to the specific knob.

6. The plant branch spacer as claimed in claim 1 comprising:
the first arc-section comprising a distal lock slot;
the distal lock slot laterally traversing through the distal end; and
the locking mechanism being removably engaged with the distal lock slot.

7. The plant branch spacer as claimed in claim 6 comprising:
the locking mechanism comprising a tooth; and
the tooth being removably positioned through the distal lock slot.

8. The plant branch spacer as claimed in claim 1 comprising:
the second arc-section comprising a plurality of lock slots;
the plurality of lock slots laterally traversing into the free end;
the plurality of lock slots being positioned along the free end; and
the locking mechanism being removably engaged with a specific lock slot among the plurality of lock slots.

9. The plant branch spacer as claimed in claim 8 comprising:
the locking mechanism comprising a tooth; and
the tooth being removably positioned into the specific lock slot.

10. The plant branch spacer as claimed in claim 1 comprising:
the first arc-section comprising a distal lock slot;
the distal lock slot being integrated into the distal end;
the second arc-section comprising a plurality of lock slots;
the plurality of lock slots being integrated into the free end; and
the distal lock slot being laterally aligned with one of the plurality of lock slots.

* * * * *